July 7, 1953        D. PERLMAN        2,644,481
AUTOMATIC FLUID TRANSFER VALVE
Filed Jan. 14, 1948
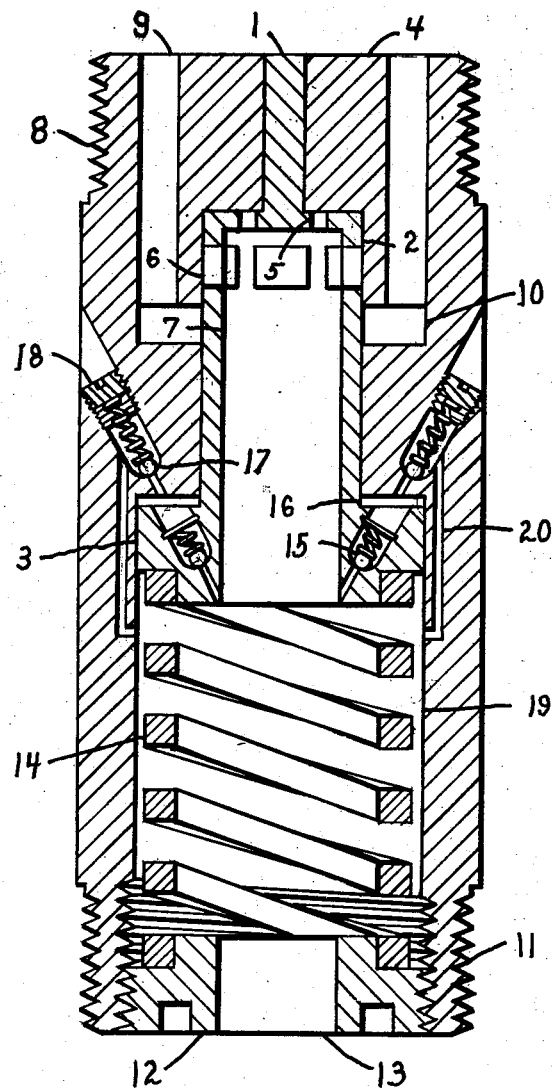
Inventor
David Perlman
By John H. Ruckman
Attorney

Patented July 7, 1953

2,644,481

UNITED STATES PATENT OFFICE 2,644,481

AUTOMATIC FLUID TRANSFER VALVE

David Perlman, New Orleans, La.

Application January 14, 1948, Serial No. 2,180

3 Claims. (Cl. 137—494)

My invention relates to new and useful improvements in an automatic fluid transfer valve for controlling the flow of fluid from a higher pressure compartment to a lower pressure compartment.

An object of my invention is to provide a comparatively small and simple automatic valve having a minimum of parts and a maximum of automatic function for the purposes intended. In a conventional compression chamber, a relatively small percentage of the pressure from this chamber per square inch is utilized in my valve to operate a piston member backed up by relatively low counter pressure such as centrifugal force, weights, or as shown, an adjustable spring. The fluid pressure acting upon the end of a small piston actuates a cooperating large piston having discharge passages to register with discharge passages in the housing of the valve, thus requiring relatively less counter pressure in relation to the fluid pressure in order to close the valve. Also to further provide a simple and adjustable automatic device for retaining the valve in the fullest open position it attains when it transfers fluid, and to permit the valve to automatically close only when the higher pressure decreases to a predetermined pressure, thus making it possible to transfer fluid at a faster rate.

The novel features which I believe to be characteristic of my invention are set forth with particularity in the appended claims. The invention, however, both as to organization and method of operation, together with additional objects and advantages thereof, will be best understood from the following description of a specific embodiment when read in connection with the accompanying drawing in which:

The figure such as shown is in central longitudinal section.

Referring to the figure, a piston member comprising a small diameter piston 1, a large diameter piston 2, and a larger diameter piston 3, is closely fitted in the housing 4. The outer end of the piston 1 is exposed at the admission end of the housing 4; the piston 2 has displacement passages 5 at one end and circumferential slots 6; the passages and slots communicate with a discharge passage 7 therein which in turn communicates with a compartment 19. The admission end of the housing 4 has external threads 8 for coupling same and internal admission passages 9 which communicate with a circumferential pressure equalizing and discharge groove 10 with which slots 6 are adapted to register. The discharge end of the housing 4 has external threads 11 for coupling same and an internal threaded member 12 having a discharge passage 13 communicating with the compartment 19. The member 12 is adapted to adjust the spring 14 acting against the piston 3 which has therein spring pressed check valves 15 for admitting fluid into compartment 16 in the housing 4. The spring pressed check valves 17 which have threaded adjustment plugs 18 are adapted to release fluid from the compartment 16 into the compartment 19 through the passages 20.

In the operation of my valve, the spring 14 is adjusted to permit the release of fluid through the passages at a predetermined fluid pressure. When the fluid pressure acting on the end of the piston 1 exceeds the counter pressure of the spring 14, the piston 2 is moved into open position wherein the slots 6 register with the groove 10, thus releasing fluid through the passages 9, 10, 6, 7, 19 and 13. When this takes place, fluid is drawn into the compartment 16 through the check valves 15 and is then retained therein by the check valves 15 and 17. The check valves 17 are adjusted to automatically release fluid only when the fluid pressure acting upon the piston 1 decreases to a predetermined pressure. Thus the valve closes only when the pressure of the spring 14 exceeds the combined pressure exerted by the check valves 17 and the fluid pressure acting upon the piston 1.

The novel features combined in the drawing such as shown and above described in detail can be modified without departing from the spirit of my invention.

The inlet end 8 of the housing 4 is threaded into a conventional compression chamber (not shown). The source of the pressure is derived from said chamber. The express purpose of this valve construction is to provide a comparatively simple and compact means to maintain the discharge passages 9 and 6 in full register in order to quickly attain a predetermined decreased pressure in the said compression chamber.

The valve 17 is adjusted to hold the valve member 3 in fully open position until said predetermined decreased pressure has been attained, otherwise as in conventional type relief valves, the valve gradually would close as the pressure decreased at the source thus slowing down the rate of discharge. The small surface area of the discharge valve 17 makes it possible to utilize a small spring in order to oppose the pressure in the compartment 16. In operation, the spring 14 is adjusted to permit the relief valve to open at a predetermined high pressure. When the predetermined decreased pressure attained at the source combined with the resistance of the valve 17 is less than the counter pressure of the spring 14, the member 3 will move into closed position.

In the operation of my valve, when the force exerted by fluid pressure in the compression chamber overcomes the tension of the spring 14, the multi-diameter piston 1, 2, and 3 moves downwardly. Fluid pressure now flows through the admission passage 9, the discharge passage 7, the groove 10, slots 6, the hollow portion of the piston, and the chamber 19 to the discharge passage 13. When this occurs, fluid pressure passes into the compartment 16, past the check valves 15 and is retained therein by spring pressed check valves 17. This maintains the piston in full discharge position until the fluid pressure acting on the piston member 1 drops to a predetermined level at which time, the pressure exerted by the spring 14 becomes greater than the combined pressure exerted by the spring acting on the valves 17 and the fluid pressure acting on the piston member 1, thus permitting fluid to discharge out of the compartment 16 past the valves 17, through the passage 20, and into the compartment 19 thus permitting the multi-diameter piston to move upwardly into closed position.

I claim:

1. In an automatic fluid transfer valve, the combination of a housing having an inlet end and a discharge end, said housing containing an internal circumferential groove and also passages leading to said circumferential groove, a unitary structure multi-diameter piston in said housing having a solid small diameter member at the inlet end of the housing, an intermediate hollow member of larger diameter fitted in said housing and containing slots adapted to be moved into and out of register with said circumferential groove, a still larger diameter hollow piston member fitted in said housing and integral with said intermediate member, the discharge end of said housing containing a chamber, a spring in said chamber tending to urge said multi-diameter piston against fluid pressure, said housing containing an annular compartment surrounding said intermediate piston member and adapted to receive fluid pressure, and check valves and passages associated with said annular chamber for releasing fluid pressure therefrom into the discharge chamber when the fluid pressure acting on said solid piston member decreases to a predetermined amount.

2. In an automatic fluid transfer valve, the combination of a housing having an inlet end and a discharge end, said housing containing an internal circumferential groove and also passages leading to said circumferential groove, a unitary multi-diameter piston in said housing having a solid small diameter member at the inlet end of the housing, an intermediate hollow member of larger diameter fitted in said housing and containing slots adapted to be moved into and out of register with said circumferential groove, a still larger diameter hollow piston member fitted in said housing and integral with said intermediate member, the discharge end of said housing containing a chamber, a spring in said chamber tending to urge said multi-diameter piston against fluid pressure, said housing containing an annular compartment surrounding said intermediate piston member and adapted to receive fluid pressure through passageways from said discharge chamber, inwardly opening check valves for controlling said passageways, passageways leading from said annular compartment back to said discharge chamber, and outwardly opening check valves for controlling said last mentioned passageways.

3. In an automatic fluid transfer valve, the combination of a housing having an inlet end and a discharge end, said housing containing an internal circumferential passageway and also passages leading to said circumferential passageway, a unitary structure multi-diameter piston in said housing having a solid small diameter member at the inlet end of the housing, an intermediate hollow member of larger diameter fitted in said housing and containing slots adapted to be moved into and out of register with said circumferential passageway, a still larger diameter hollow piston member fitted in said housing and integral with said intermediate member, the discharge end of said housing containing a chamber, a spring in said chamber tending to urge said multi-diameter piston against fluid pressure, said housing containing an annular compartment adapted for fluid pressure to act on one of said hollow piston members to maintain said member in discharge position, inwardly opening check valves in said annular compartment adapted to permit passage of fluid through the passageways from said discharge chamber, passageways leading from said annular compartment back to said discharge chamber, and outwardly opening check valves for controlling said last mentioned passageways.

DAVID PERLMAN.

References Cited in the file of this patent

UNITED STATES PATENTS

| Number | Name | Date |
|---|---|---|
| 931,532 | Wainwright | Aug. 17, 1909 |
| 2,182,724 | Hennessy | Dec. 5, 1939 |
| 2,333,415 | Du Bois | Nov. 2, 1943 |
| 2,411,930 | Mathis | Dec. 3, 1946 |